(12) United States Patent
Yen et al.

(10) Patent No.: US 11,809,227 B2
(45) Date of Patent: Nov. 7, 2023

(54) ELECTRONIC DEVICE

(71) Applicant: ASUSTEK COMPUTER INC., Taipei (TW)

(72) Inventors: Yi-Chen Yen, Taipei (TW); Yung-Hsiang Chen, Taipei (TW); Hsi-Tan Huang, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 3 days.

(21) Appl. No.: 17/468,386

(22) Filed: Sep. 7, 2021

(65) Prior Publication Data

US 2022/0075412 A1 Mar. 10, 2022

(30) Foreign Application Priority Data

Sep. 9, 2020 (TW) .................................. 109130957

(51) Int. Cl.
*G06F 1/16* (2006.01)

(52) U.S. Cl.
CPC .................................. *G06F 1/1616* (2013.01)

(58) Field of Classification Search
CPC .. G06F 1/1616; G06F 1/1656; H04M 1/0216; H04M 1/185
See application file for complete search history.

(56) References Cited

U.S. PATENT DOCUMENTS

| | | | |
|---|---|---|---|
| 8,403,136 B1 | 3/2013 | Tsai | |
| 8,954,123 B2 | 2/2015 | Suzuki | |
| 9,204,697 B2 * | 12/2015 | Yang | A45C 11/00 |
| 9,432,491 B2 | 8/2016 | Ogatsu | |
| 9,608,685 B2 * | 3/2017 | Shukla | H04M 1/18 |
| 9,958,901 B2 * | 5/2018 | Takita | G06F 1/166 |
| 10,156,866 B2 | 12/2018 | Ishikawa | |
| 2011/0261513 A1 | 10/2011 | Tho | |
| 2013/0148381 A1 | 6/2013 | Hatta | |
| 2013/0294020 A1 * | 11/2013 | Rayner | G06F 1/1628 361/679.01 |
| 2017/0135454 A1 | 5/2017 | Poon et al. | |
| 2017/0336828 A1 * | 11/2017 | Takita | G06F 1/166 |
| 2020/0233462 A1 * | 7/2020 | Ohishi | G06F 1/1643 |

FOREIGN PATENT DOCUMENTS

| | | |
|---|---|---|
| CN | 103895973 B | 10/2016 |
| CN | 209417620 U | 9/2019 |
| CN | 210038612 U | 2/2020 |

(Continued)

OTHER PUBLICATIONS

An English language translation is provided for JP2016134051A and JP2002162618A.

(Continued)

*Primary Examiner* — Anthony M Haughton
*Assistant Examiner* — Theron S Milliser
(74) *Attorney, Agent, or Firm* — Muncy, Geissler, Olds & Lowe, P.C.

(57) ABSTRACT

An electronic device is provided. The electronic device includes a function module, a casing, and a cover. The casing includes a space to accommodate the function module. The cover includes a frame and an extending portion. The frame covers the casing. The extending portion extends outward from a sidewall of the frame to protrude from the casing, and the extending portion and the frame are integrally formed.

15 Claims, 7 Drawing Sheets

(56) References Cited

FOREIGN PATENT DOCUMENTS

| JP | 2002109929 A | 4/2002 |
|----|---|---|
| JP | 2002162618 A | 6/2002 |
| JP | 5187315 B2 | 4/2013 |
| JP | 2016134051 A | 7/2016 |
| JP | 2017207923 A | 11/2017 |
| JP | 2018120060 A | 8/2018 |
| JP | 2020-115255 A | 7/2020 |
| WO | WO-2010119663 A1 | 10/2010 |
| WO | WO-2012/026444 A1 | 3/2012 |

OTHER PUBLICATIONS

Japanese Publication No. JP2018120060A corresponds to U.S. Pat. No. 10,156,866B2.
PCT Publication No. WO2010119663A1 corresponds to U.S. Pat. No. 9,432,491B2.
Japanese Publication No. JP2017207923A corresponds to U.S. Pat. No.9,958,901B2.
Office Action and Search Report issued in JP2020-175245 dated Sep. 22, 2021, is attached.
An European Search Report dated Jan. 28, 2022 in EP Application No. 21195262.7 is attached, 8 pages.
Office Action dated Jan. 31, 2023 in corresponding Japan Application No. 2020-175245.
U.S. Pat. No. 8,954,123-B2 is an English language family member of JP-5187315-B2.

\* cited by examiner

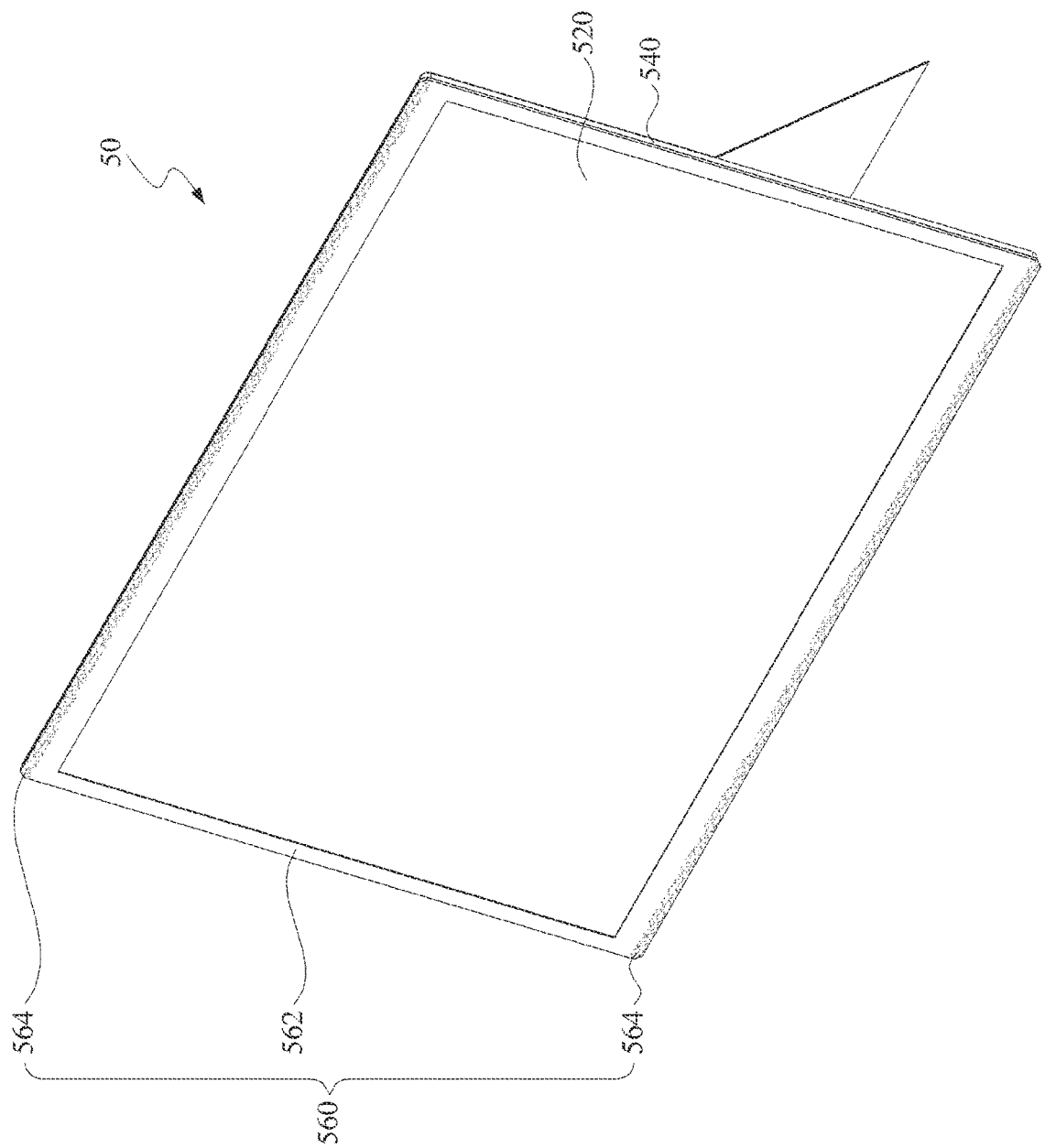

ELECTRONIC DEVICE

CROSS-REFERENCE TO RELATED APPLICATION

This application claims the priority benefit of Taiwanese application serial No. 109130957, filed on Sep. 9, 2020. The entirety of the above-mentioned patent application is hereby incorporated by reference herein and made a part of the specification.

BACKGROUND OF THE INVENTION

Field of the Invention

The invention relates to an electronic device.

Description of the Related Art

Electronic devices often provide many operating modes for users. For example, the notebook provide a tent mode by turning the screen to the back of the host and saves the space of the desktop, or facilitate to discuss by briefing to the users who sits opposite each other. However, in the tent mode, scratches are easily generated on the edge of the screen while it abuts on the desktop.

BRIEF SUMMARY OF THE INVENTION

An electronic device is provided. The electronic device includes a function module, a casing, and a cover. The casing includes a space to accommodate the function module. The cover includes a frame and an extending portion. The frame covers the casing. The extending portion extends outward from a sidewall of the frame to protrude from the casing, and the extending portion and the frame are integrally formed.

Another electronic device is also provided. The electronic device includes a function module, a casing, and a cover. The casing includes a space to accommodate the function module and includes a frame and an extending portion. The frame covers the casing. The extending portion extends outward from a sidewall of the frame to protrude from the casing, and the extending portion and the frame are integrally formed.

The electronic device provided in this disclosure includes the extending portion to avoid the screen being damaged, when the electronic device is operated in the tent mode.

BRIEF DESCRIPTION OF THE DRAWINGS

FIG. 7 is a three-dimensional schematic diagram of an electronic device according to another embodiment.

DETAILED DESCRIPTION OF THE EMBODIMENTS

In order to make the description more detailed and complete, please refer to the attached drawings and the various embodiments described below. Many practical details are described below to provide a comprehensive understanding of the present disclosure. The figures are in a very simplified form and are used in a non-precision ratio, only for convenience, and clarify the purposes of the embodiments.

Figure 1:
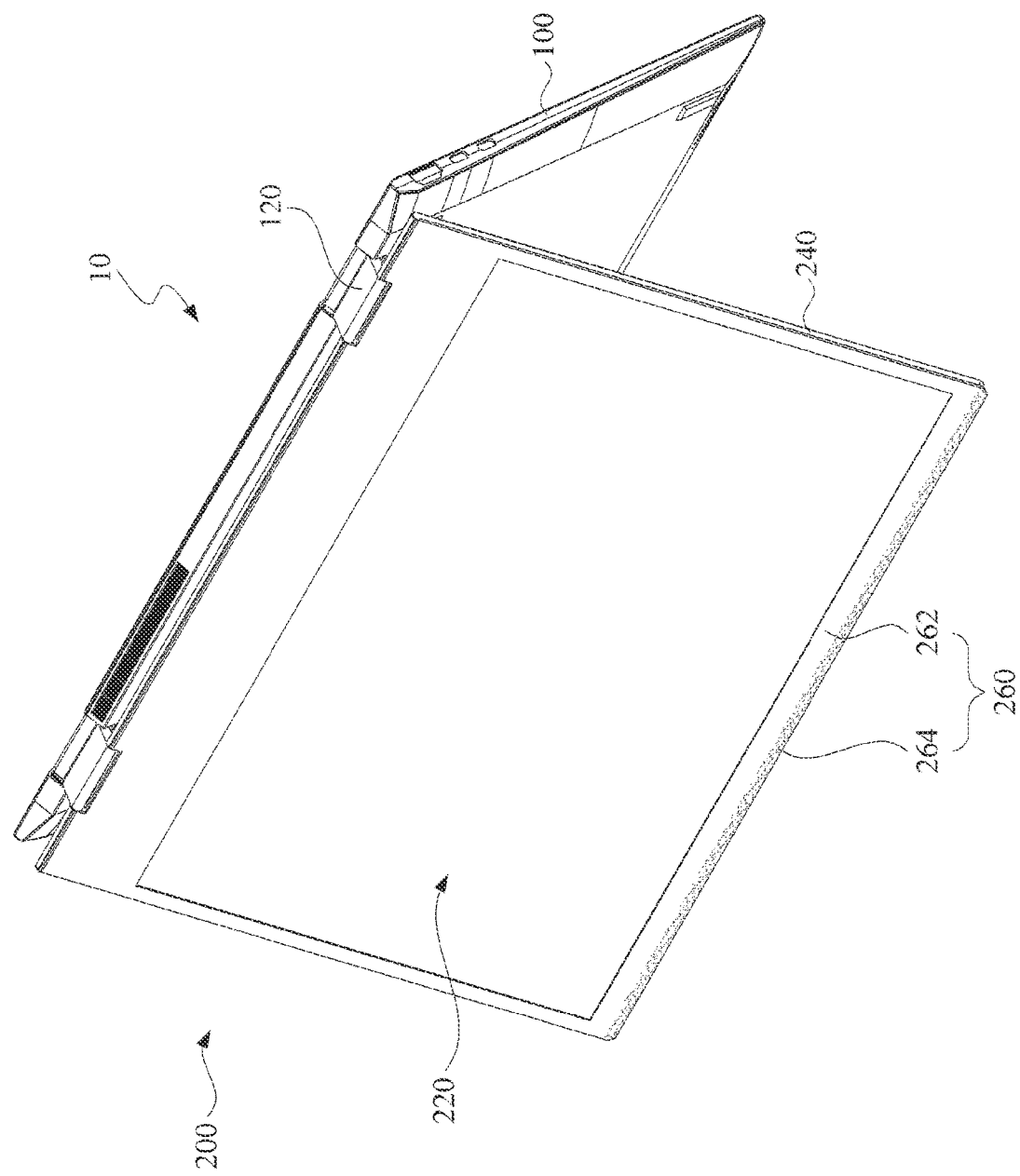
FIG. 1 is a three-dimensional schematic diagram of an electronic device according to an embodiment.
Figure 2:
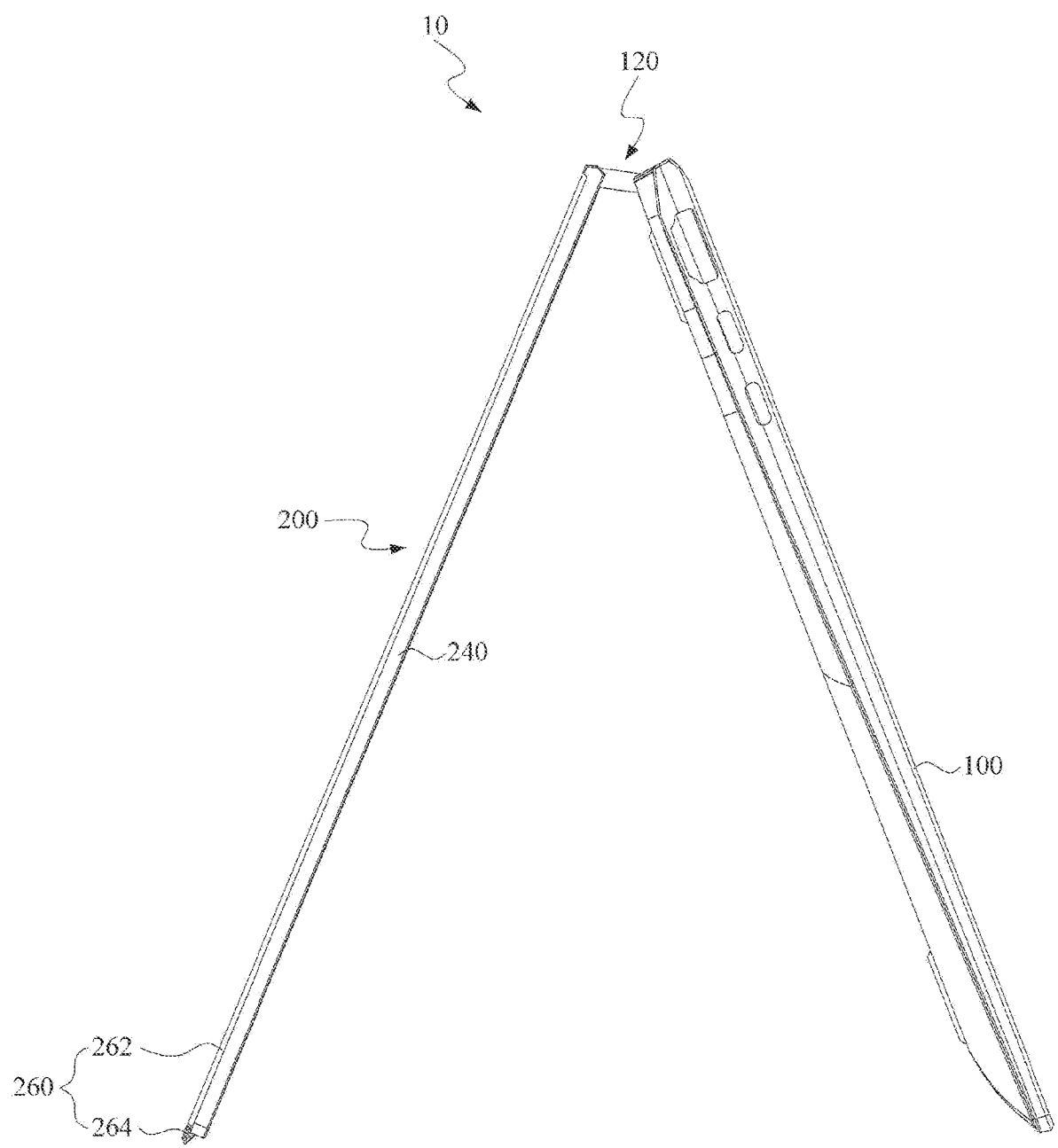
FIG. 2 is a schematic side view of the electronic device of FIG. 1.

FIG. 1 is a three-dimensional schematic diagram of an electronic device according to an embodiment. FIG. 2 is a schematic side view of the electronic device of FIG. 1. In this embodiment, a notebook computer is used to illustrate the embodiments. FIG. 1 shows that a notebook computer is equipped with a reversible screen, and is in an operating state of a tent mode (that is, the operating mode that flips the screen to the back of a host).

As shown, the electronic device 10 includes a host 100, a shaft 120 and a screen 200. The host 100 includes a keyboard module (not shown) and a touch pad (not shown) for a user to operate the host. The screen 200 is rotatably connected to the host 100 through the shaft 120. In one embodiment, the maximum rotation angle of the shaft 120 is greater than 270 degrees to provide the operating state of the tent mode.

Figure 3:
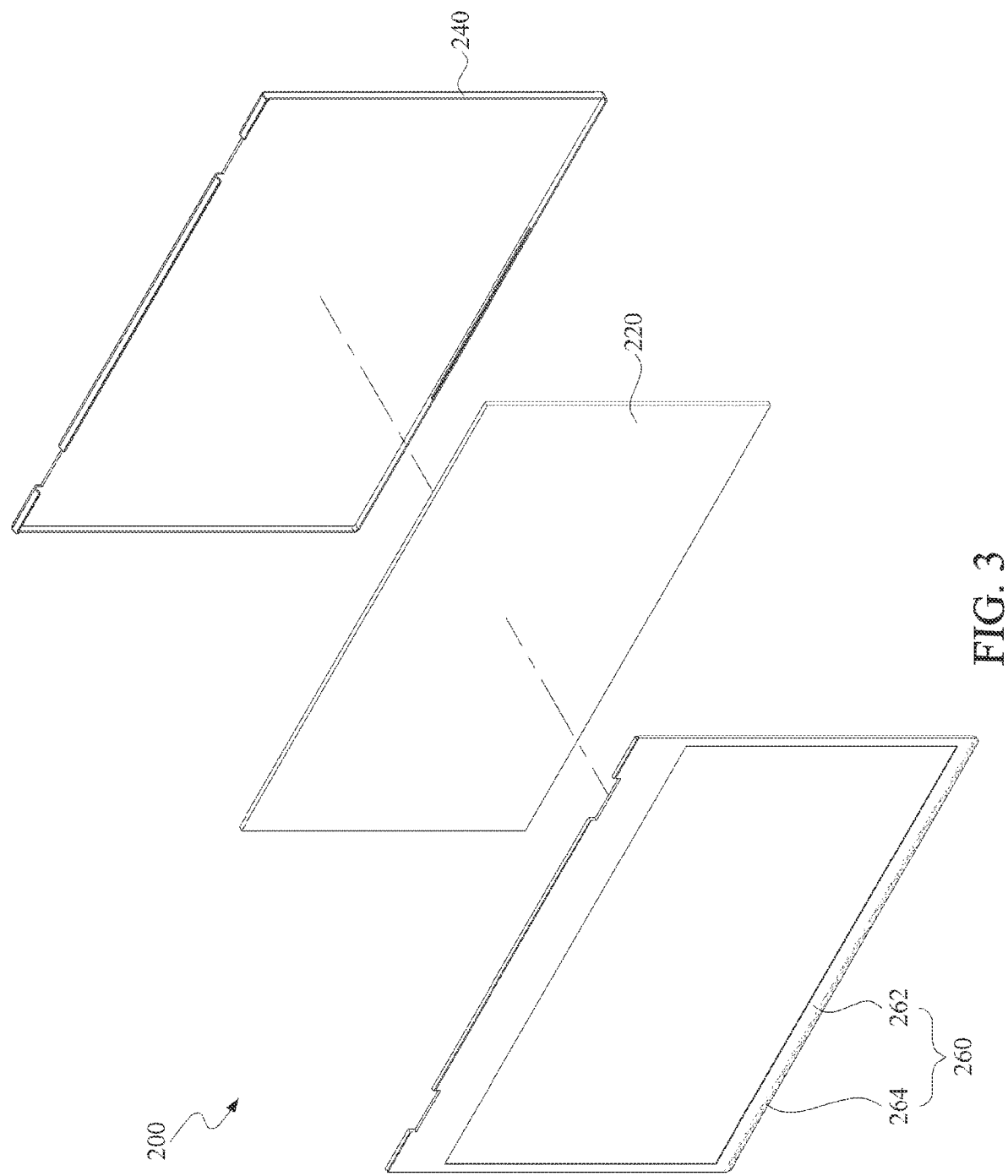
FIG. 3 is an exploded schematic diagram of a screen of the electronic device of FIG. 1 according to an embodiment.

Please also refer to FIG. 3. FIG. 3 is an exploded schematic diagram of a screen 200 of the electronic device of FIG. 1 according to an embodiment. As shown, the screen 200 includes a function module, a casing 240, and a cover 260. In the present embodiment, the function module is a display panel 220.

The display panel 220 is disposed between the casing 240 and the cover 260. The casing 240 and the cover 260 form a space to accommodate the display panel 220. The cover 260 includes a frame 262 and an extending portion 264. The frame 262 is combined with the casing 240 to fix the display panel 220.

Figure 4:
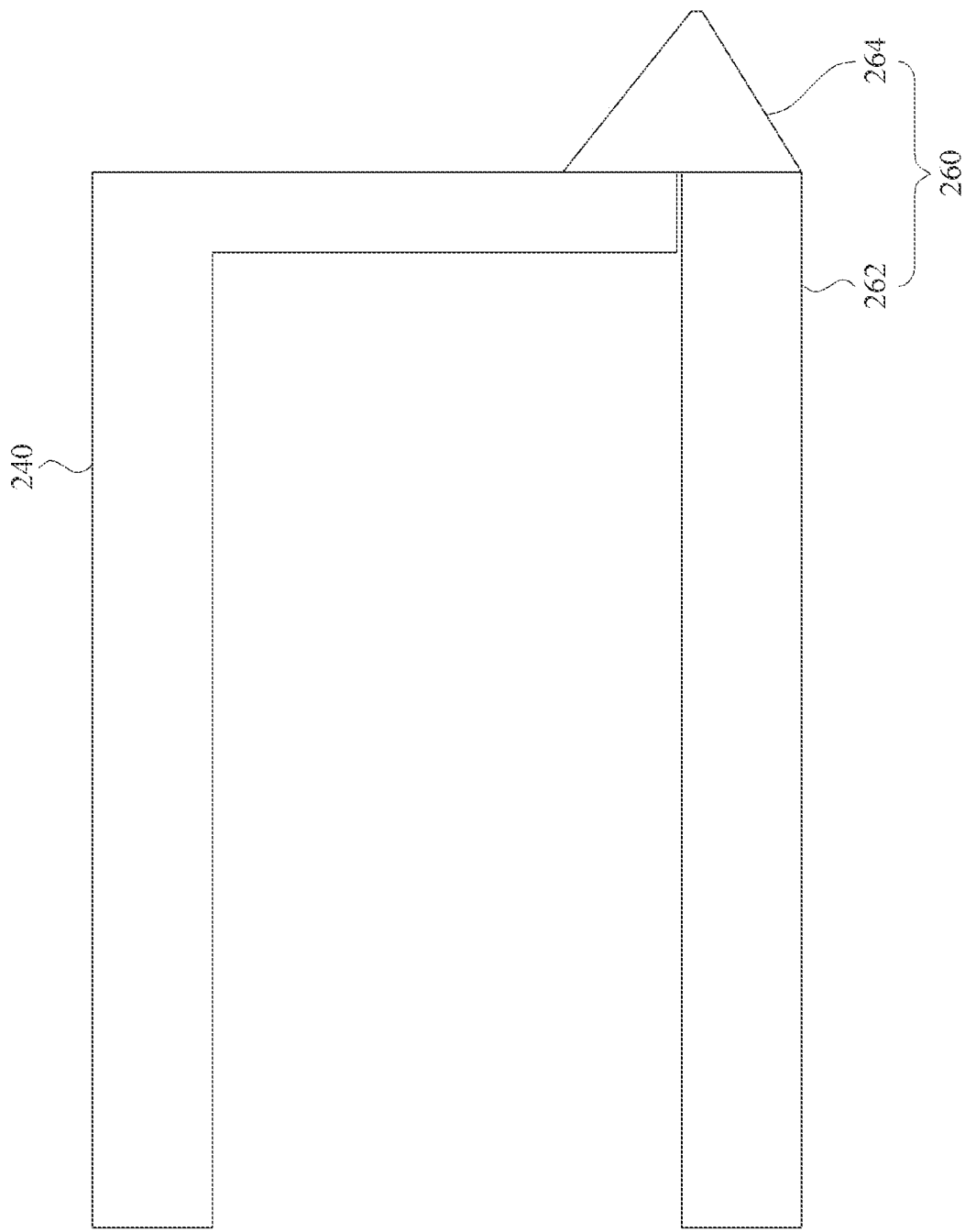
FIG. 4 is a schematic cross-sectional view of an extending portion of FIG. 3.

In other words, the cover 260 is taken as a fixing frame to fix the display panel. Please refer to FIG. 4 together. FIG. 4 is a schematic cross-sectional view of an extending portion of FIG. 3. As shown, the extending portion 264 extends outward from a sidewall of the frame 262 and protrudes from the casing 240.

In one embodiment, the edge of the extending portion 264 abuts the surface of a table while the electronic device is in a tent shape, which is not limited herein. The edge of the extending portion 264 is also arc-shaped or other shapes without sharp corners.

In one embodiment, the extending portion 264 is disposed on a side of the casing 240 away from the shaft 120. That is, in the operating state of the tent mode, the screen 200 abuts on one side of the desktop. In one embodiment, the distance that the extending portion 264 extends outward to protrude the casing 240 is greater than 0.4 mm to prevent the casing 240 from directly hitting the table top.

In order to meet the needs that the frame 262 fixes to the display panel 220 and the extending portion 264 protects the display panel 220, the extending portion 264 and the frame 262 are made of different materials. In one embodiment, the frame 262 is made of a hard plastic material, such as ABS plastic, and the extending portion 264 is made of an elastic plastic material, such as silicone rubber.

In order to ensure a good structural strength of the joining surface of the extending portion 264 and the frame 262 to prevent the extending portion 264 from loosening, the extending portion 264 and the frame 262 are integrally formed. Moreover, in one embodiment, the cover 260 is manufactured by a double injection molding process to manufacture the rigid frame 262 and the elastic extending portion 264 at the same time.

Figure 5:
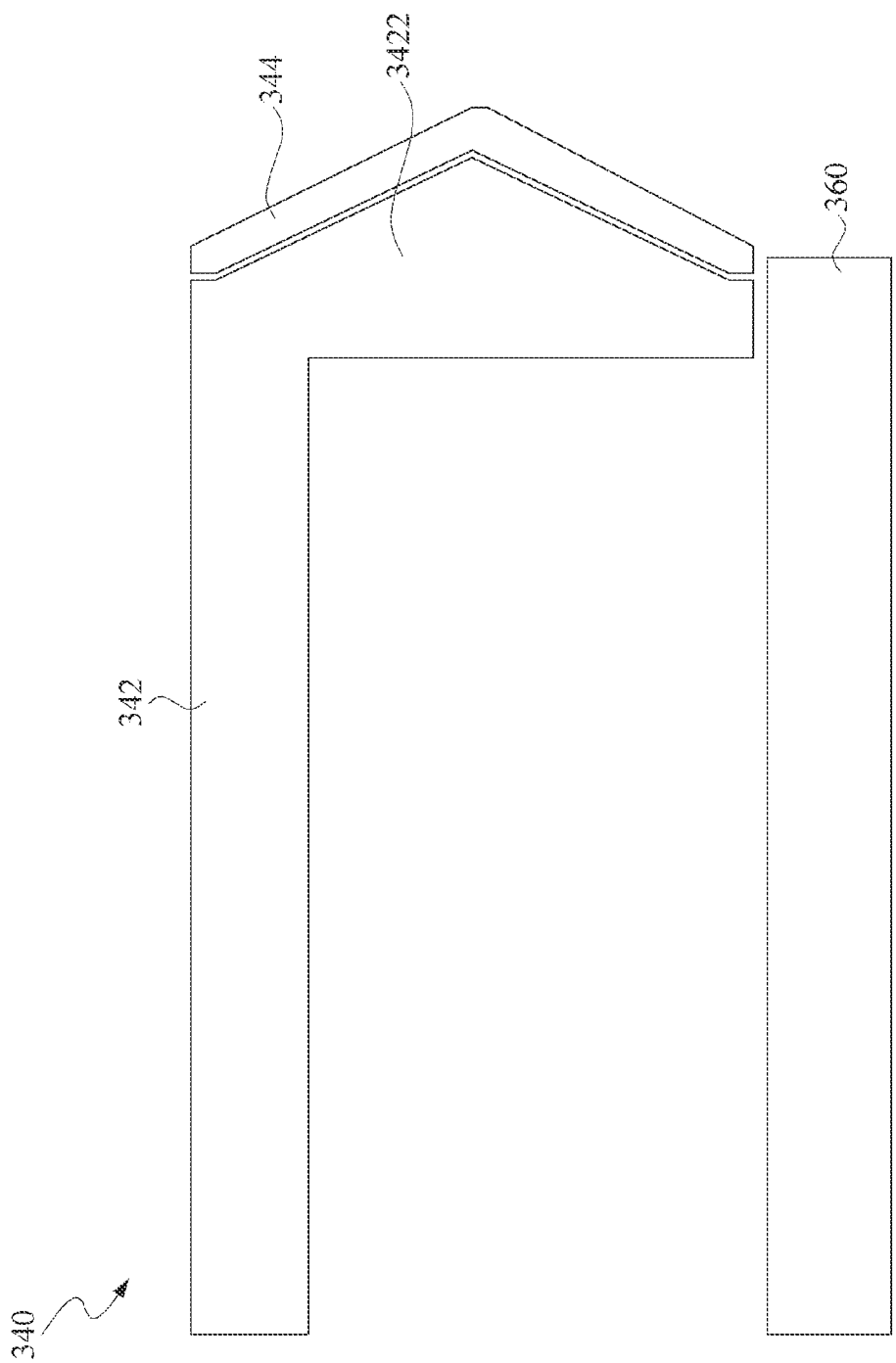
FIG. 5 is a schematic cross-sectional view of the extending portion according to another embodiment.

Referring to FIG. 5, FIG. 5 is a schematic cross-sectional view of the extending portion according to another embodiment. As shown, the casing 340 includes a frame 342, and the overall height of the frame 342 is greater than the cover 360. In this embodiment, the extending portion 344 extends outward from a sidewall 3422 of the frame 342 and protrudes from the cover 360 to prevent the frame 342 or the cover 360 from directly colliding with the desktop.

In one embodiment, the extending portion 344 is at the ridge of a tent shape and extends to the upper and lower edges of the casing 340 to provide well protection. Furthermore, in one embodiment, in order to ensure the structural rigidity of the frame 342 and the sidewall, the outer surface of the sidewall 3422 of the frame 342 also presents a tent shape, and the extending portion 344 is formed on the outside of the sidewall 3422 along the undulations of the sidewall 3422.

Regarding to material, in one embodiment, as shown, the frame 342 is made of a hard plastic material. The extending portion 344 is formed on the side of the frame 342, especially formed on the position easily collided with the table top. The extending portion 344 is made of an elastic plastic material, such as silicone. In one embodiment, the frame 342 and the extending portion 344 are manufactured by a double injection molding process.

Figure 6:
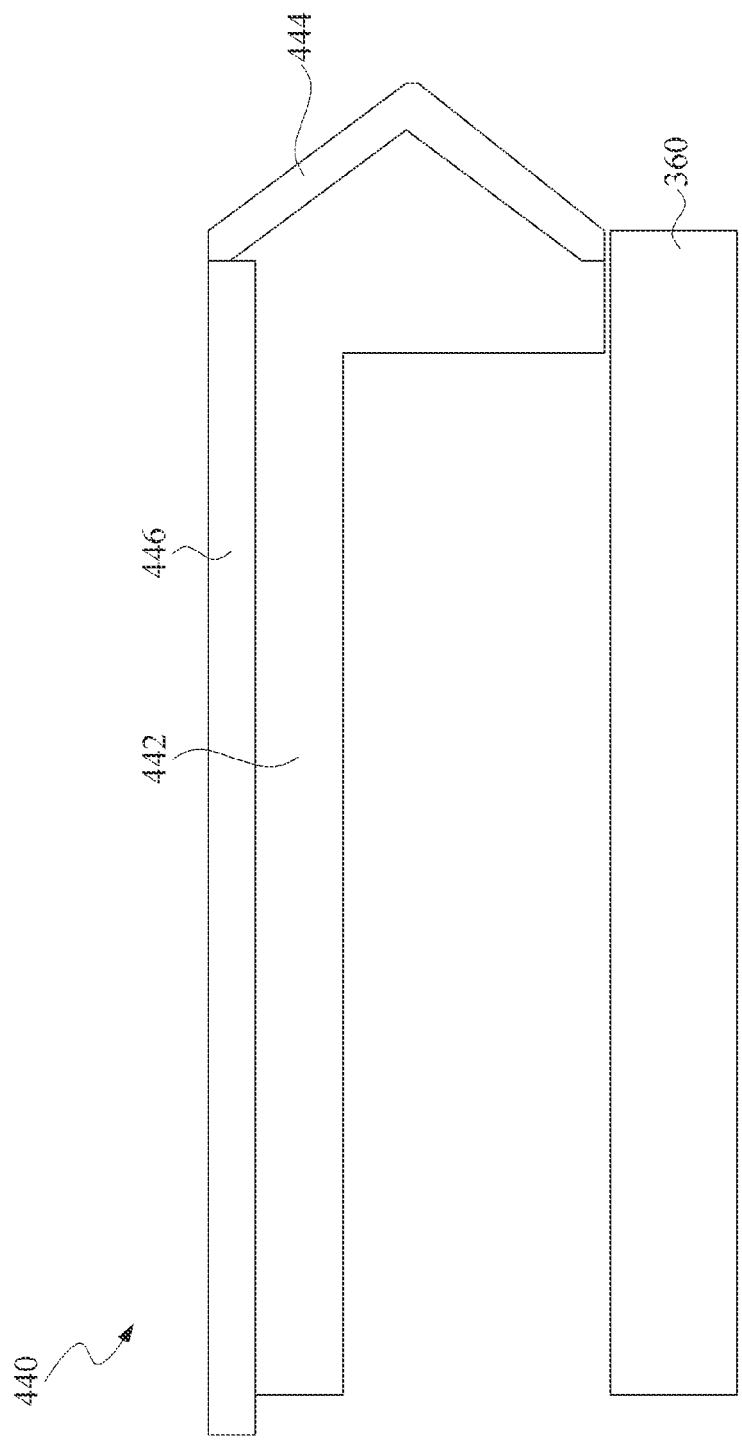
FIG. 6 is a schematic cross-sectional view of the extending portion according to another embodiment.

Please also refer to FIG. 6. FIG. 6 is a schematic cross-sectional view of the extending portion according to another embodiment. Compared with the embodiment of FIG. 5, except for that the extending portion 444 is formed on the side of the frame 442, a metal layer 446, such as an aluminum layer, is additionally covered at the surface of the frame 442, especially covered at the position not easily collided with the desktop (such as the back of the screen) to present a metallic texture.

In the foregoing embodiment, the extending portions 264, 344, 444 are disposed on the cover 260 or the casing 340, 440 of the screen 200 to prevent the hard shell damaged from hitting the table top or other hard objects, and further to protect the display panel 220 from damages, which is not limited herein. The extending portions 264, 344, 444 also protects other types of the function module.

In one embodiment, the extending portions 264, 344, 444 are also formed at the edge of the casing of the host 100 to protect the display panel 220, or other function module, such as a motherboard, a keyboard module, a hard disk inside the casing, and further to prevent the casing of the host from being scratched. In addition, the extending portions 264, 344, 444 are not only formed on a side of the cover 260 or the casing 340, 440 away from the shaft 120, but also formed on a side close to the shaft 120 to provide well protection.

The electronic device of the disclosure is not only applicable to notebook computers as shown in FIG. 1, but also applicable to tablet computers. FIG. 7 is a three-dimensional schematic diagram of an electronic device according to another embodiment. The figure shows a tablet computer used with a stand to illustrate another embodiment.

Compared with the electronic device 10 in FIG. 1 including the host 100, the shaft 120 and the screen 200, the host and the screen of the electronic device 50 of this embodiment are integrated in the same body. The electronic device 50 also includes a display panel 520, a casing 540, and a cover 560.

Similar to the structure of the screen 200 of the electronic device 10 in the FIG. 1, the casing 540 of this embodiment includes a space to accommodate the display panel 520 and other electronic components of the host, such as a central processing unit, a motherboard, and a memory. The frame 562 is combined with the casing 540 to fix the display panel 520, and the extending portion 564 extends outward from the frame 562 and protrudes from the casing 540.

Since the tablet computer is often operated in varies directions, in one embodiment, the cover 560 includes two extending portions 564 that formed by the two sidewalls of the frame 562 extending outward and protruding from the casing 540, to meet the demand for horizontal use of the tablet, which is not limited herein. In one embodiment, the extending portions 564 are provided around the cover 560 to meet the requirements of horizontal and vertical use.

The electronic device provided in this disclosure includes the extending portion to avoid the screen being damaged, when the electronic device is operated in the tent mode.

Although the present invention has been described in considerable detail with reference to certain preferred embodiments thereof, the disclosure is not for limiting the scope of the invention. Persons having ordinary skill in the art may make various modifications and changes without departing from the scope. Therefore, the scope of the appended claims should not be limited to the description of the preferred embodiments described above.

What is claimed is:

1. An electronic device, comprising:
 a function module;
 a casing, having a space to accommodate the function module; and
 a cover, including a frame and an extending portion, wherein the frame covers the casing, the extending portion extends outward from an outer surface of a sidewall of the frame to protrude from the casing, and the extending portion and the frame are integrally formed,
 wherein the extending portion is of a tent shape and extends to an upper edge and a lower edge of the cover, and
 wherein the outer surface of the sidewall has a tent shape, and the extending portion is formed on the sidewall along undulations of the sidewall.

2. The electronic device according to claim 1, wherein, the function module is a display panel, and the cover is a fixing frame.

3. The electronic device according to claim 1, further comprising a host and a shaft, wherein the casing is connected to the host through the shaft.

4. The electronic device according to claim 1, wherein, the extending portion and the frame are made of different materials.

5. The electronic device according to claim 1, wherein, a number of the extending portion is two, and the two extending portions extend outward from the opposite sidewalls of the frame and protrudes from the casing.

6. An electronic device, comprising:
 a function module;
 a casing, having a space to accommodate the function module, and including a frame and an extending portion; and
 a cover, covering the frame;
 wherein, the extending portion extends outward from an outer surface of a sidewall of the frame and protrude from the cover, and the extending portion and the frame are integrally formed,
 wherein the extending portion is of a tent shape and extends to an upper edge and a lower edge of the casing, and wherein the outer surface of the sidewall has a tent shape, and the extending portion is formed on the sidewall along undulations of the sidewall.

7. The electronic device according to claim 6, wherein, the function module is a display panel, and the cover is a fixing frame.

8. The electronic device according to claim 6, further comprising a host and a shaft, wherein the casing is connected to the host through the shaft.

9. The electronic device according to claim 8, wherein, a maximum rotation angle of the shaft is greater than 270 degrees.

10. The electronic device according to claim 8, wherein, the extending portion is located on a side of the casing away from the shaft.

11. The electronic device according to claim 6, wherein, the extending portion and the frame are made of different materials.

12. The electronic device according to claim 6, wherein, the frame is made of a hard plastic material, and the extending portion is made of an elastic plastic material.

13. The electronic device according to claim 6, wherein, the extending portion is made of silicone rubber.

14. The electronic device according to claim 6, wherein, the casing is manufactured by a double injection molding process.

15. The electronic device according to claim 6, wherein, a number of the extending portion is two, and the two extending portions extend outward from the opposite sidewalls of the frame to protrude from the cover.

\* \* \* \* \*